United States Patent
Sakai

(10) Patent No.: US 11,334,775 B2
(45) Date of Patent: May 17, 2022

(54) OBJECT DETECTION DEVICE, OBJECT DETECTION METHOD, AND PROGRAM

(71) Applicant: Omron Corporation, Kyoto (JP)

(72) Inventor: Shun Sakai, Tokyo (JP)

(73) Assignee: Omron Corporation, Kyoto (JP)

( * ) Notice: Subject to any disclaimer, the term of this patent is extended or adjusted under 35 U.S.C. 154(b) by 287 days.

(21) Appl. No.: 16/613,936

(22) PCT Filed: Jul. 11, 2018

(86) PCT No.: PCT/JP2018/026169
§ 371 (c)(1),
(2) Date: Nov. 15, 2019

(87) PCT Pub. No.: WO2019/013246
PCT Pub. Date: Jan. 17, 2019

(65) Prior Publication Data
US 2021/0357708 A1    Nov. 18, 2021

(30) Foreign Application Priority Data

Jul. 14, 2017    (JP) .............................. JP2017-138536

(51) Int. Cl.
*G06K 9/62*    (2022.01)
*G06K 9/20*    (2006.01)
(Continued)

(52) U.S. Cl.
CPC ......... *G06K 9/6289* (2013.01); *G06K 9/6215* (2013.01); *G06V 10/22* (2022.01);
(Continued)

(58) Field of Classification Search
CPC ............. G06K 9/6289; G06K 9/00255; G06K 9/00362; G06K 9/2054; G06K 9/6215; G06K 9/685; G06K 2209/21
See application file for complete search history.

(56) References Cited

U.S. PATENT DOCUMENTS

2005/0094849 A1    5/2005    Sung et al.
2009/0303342 A1*  12/2009    Corcoran ................ G06K 9/00
                                                         348/222.1
(Continued)

FOREIGN PATENT DOCUMENTS

JP    2004192646 A    7/2004
JP    2007133840 A    5/2007
(Continued)

OTHER PUBLICATIONS

International Search Report issued in International Application No. PCT/JP2018/026169, dated Oct. 2, 2018 (1 page).
(Continued)

*Primary Examiner* — David F Dunphy
(74) *Attorney, Agent, or Firm* — Osha Bergman Watanabe & Burton LLP

(57) ABSTRACT

An object detection device detects a predetermined object from an image. The object detection device includes a first detection unit configured to detect a plurality of candidate regions where the predetermined object exists from the image, a region integrating unit configured to determine one or a plurality of integrated regions according to the plurality of candidate regions detected by the first detection unit, and a second detection unit configured to detect, in the one or the plurality of integrated regions, the predetermined object by using a detection algorithm different from an algorithm of the first detection unit. As a result, it is possible to detect the predetermined object faster and more accurately than before.

13 Claims, 10 Drawing Sheets

(51) Int. Cl.
*G06K 9/68* (2006.01)
*G06K 9/00* (2022.01)
*G06V 10/22* (2022.01)
*G06V 30/24* (2022.01)
*G06V 40/10* (2022.01)
*G06V 40/16* (2022.01)

(52) U.S. Cl.
CPC ............ *G06V 30/248* (2022.01); *G06V 40/10* (2022.01); *G06V 40/166* (2022.01); *G06V 2201/07* (2022.01)

(56) References Cited

U.S. PATENT DOCUMENTS

| | | |
|---|---|---|
| 2013/0202163 A1 | 8/2013 | Shimada et al. |
| 2016/0063316 A1* | 3/2016 | Lee .................... G06K 9/00261 382/118 |
| 2016/0117544 A1* | 4/2016 | Hoyos ................ G06K 9/00604 348/78 |

FOREIGN PATENT DOCUMENTS

| | | | |
|---|---|---|---|
| JP | 2008102611 A | 5/2008 |
| JP | 2011193115 A | 9/2011 |
| JP | 2013161405 A | 8/2013 |

OTHER PUBLICATIONS

Written Opinion issued in International Application No. PCT/JP2018/026169; dated Oct. 2, 2018 (10 pages).

\* cited by examiner (A)

(B)

(A)

(B)

(A)

(B)

(A)

(B)

(C)

Grouping in consideration of distance between regions and size similarity
→ Classified into two groups (A)

(B)

OBJECT DETECTION DEVICE, OBJECT DETECTION METHOD, AND PROGRAM

TECHNICAL FIELD

The present invention relates to a technique for detecting an object from an image.

BACKGROUND ART

Conventionally, a technique for detecting a predetermined object such as a human face from an image is known. For example, a technique using a Haar-like feature quantity as an image feature quantity and AdaBoost as a learning algorithm is known (Patent Documents 1 and 2). AdaBoost is a learning/classification algorithm that creates a strong discriminator by connecting a lot of weak discriminators that are not so high in discrimination ability.

In recent years, with the advent of deep learning, image detection accuracy has improved dramatically. However, deep learning uses a multi-layer network called a convolutional neural network (CNN), and the calculation amount is much higher than that of the conventional technique.

Since deep learning has a high calculation load as described above, deep learning has been regarded as unsuitable for an embedded device such as a mobile device. Even considering recent technological innovations, it is not easy to execute a deep learning algorithm in an embedded device. In consideration of such a situation, a fast and highly accurate object detection algorithm that can operate even in a device having little calculation resources such as an embedded device is required.

PRIOR ART DOCUMENTS

Patent Documents

Patent Document 1: Japanese Unexamined Patent Publication No. 2007-133840
Patent Document 2: Japanese Unexamined Patent Publication No. 2008-102611

SUMMARY OF THE INVENTION

Problems to be Solved by the Invention

An object of the present invention is to provide a technique enabling fast and highly accurate object detection.

Means for Solving the Problem

The present invention includes a first detection unit and a second detection unit that detect a predetermined object from an image by using detection algorithms different from each other, integrates candidate regions detected by the first detector, and causes the second detection unit to detect the object only in the integrated candidate region.

More specifically, the object detection device according to the present invention is an object detection device that detects a predetermined object from an image, and includes a first detection unit, a second detection unit, and a region integrating unit. The first detection unit and the second detection unit are both configured to detect a predetermined object from an image; however, detection algorithms of the first detection unit and the second detection unit are different. Here, the detection algorithm of the second detection unit may be a detection algorithm having a higher detection accuracy but a greater calculation amount than those of the first detection unit.

The first detection unit is configured to detect a plurality of candidate regions in which an object is estimated to exist from an image. The region integrating unit is configured to determine one or a plurality of integrated regions according to the plurality of candidate regions. The second detection unit is configured to detect an object in the integrated region.

According to such a configuration, since the second detection unit can detect an object only in the integrated region, the processing speed can be increased and detection accuracy of the second detection unit can be maintained. That is, the object detection device according to the present invention enables fast and highly accurate object recognition.

The region integrating unit according to the present invention can be configured to determine the integrated region in the following manner. The region integrating unit can be configured to first determine a representative region from among a plurality of candidate regions, to determine, according to a predetermined criterion, a region related to the representative region (hereinafter also referred to as a related region) from among the plurality of candidate regions, and to determine the integrated region by integrating the representative region and the related region.

The region integrating unit may determine a plurality of integrated regions. In that case, the region integrating unit is configured to determine one integrated region and then to perform the above-described process on the candidate regions obtained by excluding the representative region and related region from the plurality of candidate regions detected by the first detection unit to determine another integrated region. By repeating this process N times, N integrated regions can be determined.

As a criterion for determining the representative region, the reliability of the detection result obtained by the first detection unit or the size of the candidate region can be adopted. For example, the candidate region with the highest reliability may be determined to be the representative region. In addition, the largest candidate region may be determined to be a representative region, or the candidate region closest to a predetermined size may be determined to be representative region. In addition, a representative region may be determined according to an average or a weighted average of the evaluation (score) based on reliability and the evaluation (score) based on size.

By adopting such a criterion, a region that is highly likely to include a predetermined object can be determined to be a representative region.

The distance between a representative region and a candidate region can be adopted as a criterion for determining a related region. For example, the region integrating unit may determine a candidate region whose distance to the representative region is a predetermined value or less to be a related region, or may determine, to be related regions, candidate regions whose distances to the representative region are the top predetermined number of shortest.

As a criterion for determining the related region, similarity of the detection result obtained by the first detection unit may be adopted. Examples of the similarity of the detection result include similarity of the detection result reliability, similarity of the detection region size, similarity of the detected object orientation in an image, and similarity of the detected object attribute. Here, any property that can classify the detected object falls under the attribute of the detected object. For example, in a case where a detected object is a human (including a face and a human body), non-limiting examples of the attribute include age, sex, race, facial expression, and the like.

In a case where the region integrating unit determines a related region by focusing on a plurality of viewpoints (for example, a plurality of the distance between regions, reliability, the region size, and the attribute), the region integrating unit may determine the related region according to the average or the weighted average of evaluations (scores) regarding the respective viewpoints. Here, the region integrating unit may determine candidate regions having top predetermined number of greatest weighted average scores (including average scores) to be related regions. Alternatively, the region integrating unit may determine all the candidate regions having average scores greater than or equal to a threshold to be related regions without limiting the number of candidate regions.

In a case where a target object is included in an image, the first detection unit may determine that a plurality of candidate regions is detected near the target object. By determining related regions as described above, a plurality of candidate regions detected for one target object can be determined to be related regions.

The method by which the region integrating unit determines an integrated region from a representative region and a related regions is not particularly limited. For example, the region integrating unit may determine a representative region itself to be an integrated region. Alternatively, the region integrating unit may determine the region obtained by averaging or performing a weighted average on a representative region and a related region to be the integrated region. The average region may be determined by averaging respective parameters specifying the regions, such as parameters specifying the region center position, parameters specifying the region size, and parameters specifying the region orientation.

The object detection device according to the present invention may perform object detection on a still image, or may perform object detection on a frame image included in a moving image. In a case where object detection is performed on a frame image constituting a moving image, the region integrating unit may determine, to be an integrated region, a region obtained by averaging or performing an weighted average on the representative region and the related region in a current frame and the representative region and the related region in a past frame.

By determining the integrated region using the detection result in the past frame as described above, an appropriate integrated region can be determined even in a case where detection in the current frame is not correct.

The object detection device according to the present invention preferably further includes an output unit that outputs detection result information indicating that a predetermined object is detected. The output unit is configured to judge that an object is detected in the integrated region in which reliability of the detection result obtained by the second detection unit is higher than or equal to a threshold, and to output detection result information regarding the integrated region. The detection result information preferably includes the detection location and size of the object. The detection result information preferably further includes information such as reliability and an object attribute.

The detection result information described above may be a detection result obtained by the first detection unit, a detection result obtained by the second detection result, or a combination of the detection results obtained by the first detection unit and the second detection unit. Here, the detection result obtained by the first detection unit may be a detection result for the representative region, or may be a result of averaging or performing a weighted average on the detection results for the representative region and the related region. When the detection results obtained by the first detection unit and the second detection unit are integrated, a simple average or a weighted average may be used.

Note that the present invention can be understood as an object detection device including at least some of the above units. In addition, the present invention can also be understood as an object detection method. Moreover, the present invention can also be understood as a computer program for causing a computer to execute each step of the object detection method, or a computer-readable storage medium storing the program in a non-transitory manner. Each of the above configurations and processes can be combined with each other to constitute the present invention as long as no technical contradiction occurs.

Effect of the Invention

The present invention enables fast and highly accurate object detection, and highly accurate object detection even in a computer with little calculation resources.

BRIEF DESCRIPTION OF THE DRAWINGS

FIG. 8A illustrates an example of the input image, FIG. 8B illustrates an example of the face detection result obtained by the first detector, and FIG. 8C illustrates an example of the determination results of the representative regions and the related regions.

MODE FOR CARRYING OUT THE INVENTION

First Embodiment

The embodiment described below relates to a face detection device (object detection device) that is mounted on a portable information terminal such as a smartphone and detects a face from an image. However, this is only an example, and an object to be detected from an image need not be a face, and may be any object. In addition, the face detection device (object detection device) may be mounted on any information processing device (computer) other than the portable information terminal.

The face detection device according to the embodiment includes a first face detector using a Haar-like feature quantity and adaboost, and a second face detector using deep learning. However, if deep learning-type face detection is performed on the entire input image, the processing time will be significant. Therefore, the face detection device according to the embodiment causes the first face detector to perform detection on the entire input image to determine a region where a face is likely to exist (exclude a region where a face is unlikely to exist), and causes the second face detector to detect a face only in the determined region. Therefore, highly accurate face detection using deep learning can be realized in a short time. Note that in a case where it is desired to further reduce the processing time of the second face detector, the number of regions processed by the second face detector may be limited. That is, only some of the plurality of regions determined by the first face detector may be processed by the second face detector. In this case, for example, the second face detector processes N (N is an integer greater than or equal to 1) regions in order of region determination by the first face detector, or the second face detector processes N regions in descending order of region size.

<Configuration>

Figure 1:
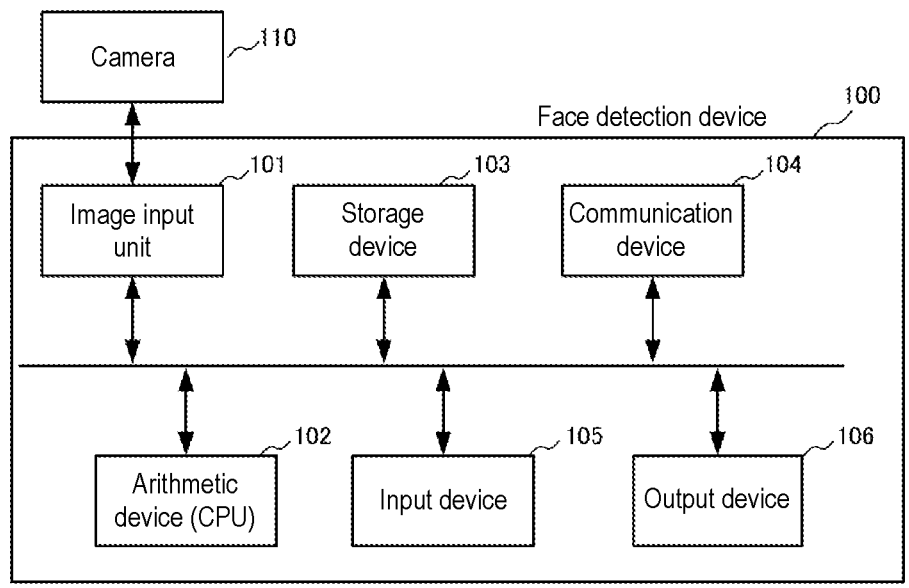
FIG. 1A is a diagram illustrating a hardware configuration of a face detection device according to a first embodiment.
FIG. 1B is a diagram illustrating functional blocks of the face detection device according to the first embodiment.
Figure 1:
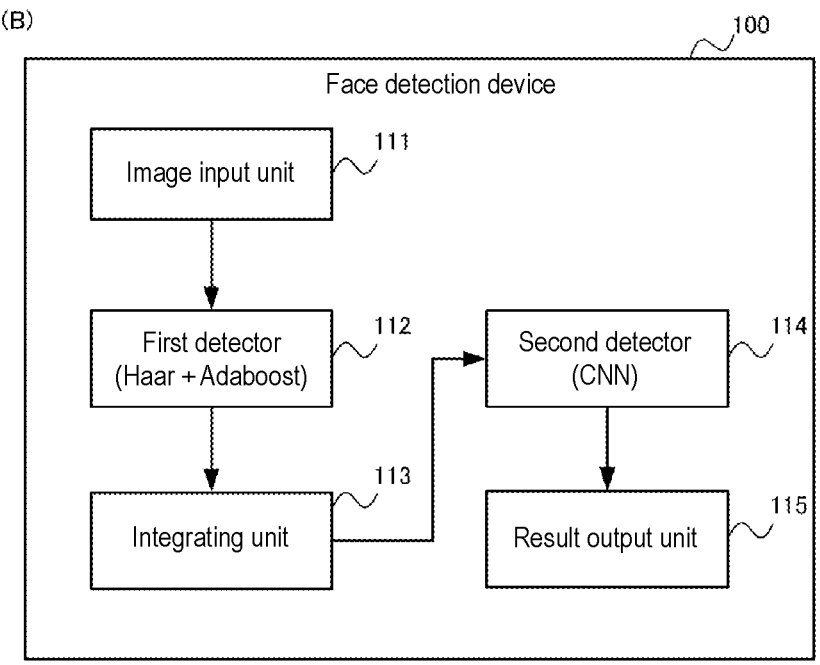

FIG. 1A is a diagram illustrating a hardware configuration of a face detection device 100 according to the embodiment. The face detection device 100 includes an image input unit 101, an arithmetic device 102, a storage device 103, a communication device 104, an input device 105, and an output device 106. The image input unit 101 is an interface that receives image data from a camera 110. Note that in the embodiment, the image input unit 101 directly receives image data from the camera 110; however, the image input unit 101 may receive image data through a communication device 104 or may receive image data via a recording medium. The arithmetic device 102 is a general-purpose processor such as a CPU (Central Processing Unit), and executes a program stored in the storage device 103 to realize functions to be described later. The storage device 103 includes a main storage device and an auxiliary storage device, stores a program executed by the arithmetic device 102, and stores image data and transient data created during program execution. The communication device 104 is a device for the face detection device 10 to communicate with an external computer. The communication mode may be wired or wireless, and the communication standard may be any. The input device 105 includes any one of a touch screen, a button, a keyboard, and the like, and is a device for a user to input an instruction to the face detection device. The output device 106 includes a display device, a speaker, or the like, and is a device for the face detection device to perform output to the user.

<Function and Process of Face Detection Device>

The arithmetic device 102 executes the program to realize the functions as illustrated in FIG. 1B. That is, the arithmetic device 102 functions as an image input unit 111, a first detector 112, an integrating unit 113, a second detector 114, and a result output unit 115. The processing content of each unit will be described below.

Figure 2:
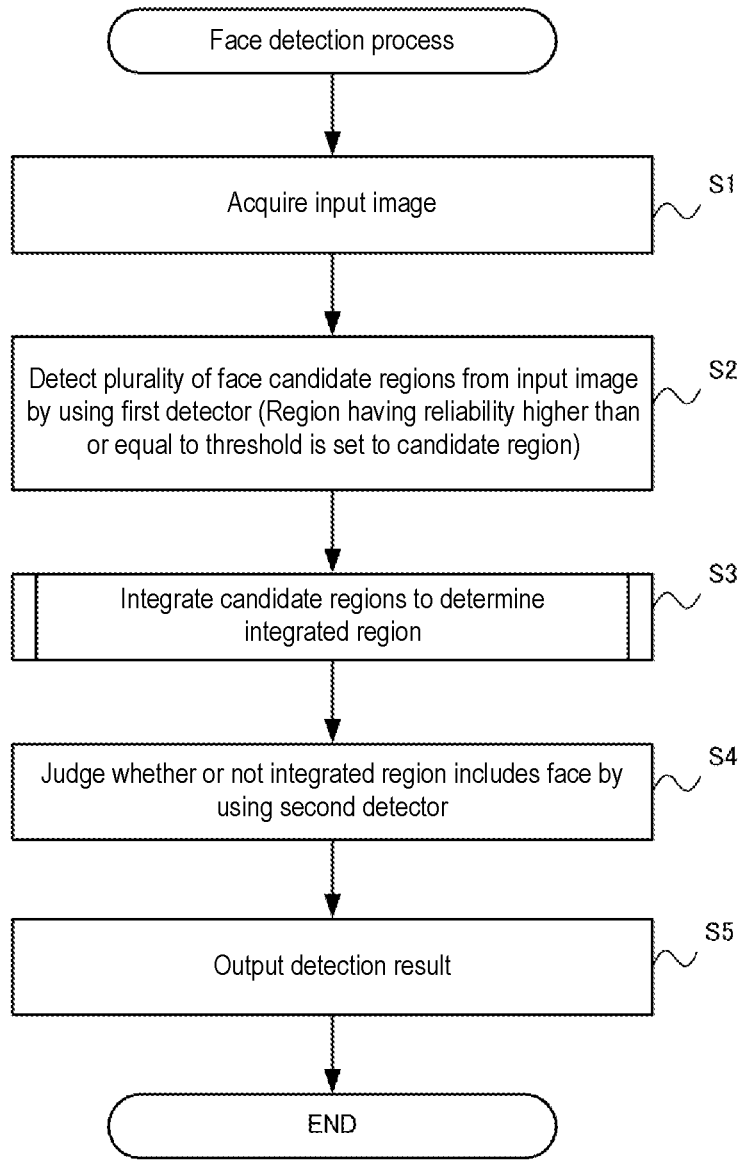
FIG. 2 is a flowchart illustrating a flow of face detection processes according to the first embodiment.

FIG. 2 is a flowchart illustrating the overall flow of the face detection process performed by the face detection device 100. Hereinafter, details of the face detection device 100 will be described with reference to the flowchart of FIG. 2.

[S1: Image Input Process]

In step S1, the face detection device 100 acquires an image (input image). The face detection device 100 may acquire an input image from the camera 20 via the image input unit 101, may acquire the input image from another computer via the communication device 104, or may acquire the input imaged from a storage medium via the storage device 103.

[S2: First Face Detection Process]

In step S2, the first detector 112 detects a face candidate region (region where a face is estimated to exist) from the input image. The first detector 112 is configured to be able to detect faces of various sizes, orientations, attributes (sex, age, race, and the like) from the input image. When detecting a face candidate region, the first detector 112 also estimates the certainty factor, the face orientation, or the attribute.

In the embodiment, the first detector 112 is configured to use a Haar-like feature quantity as an image feature quantity and AdaBoost as a learning algorithm. Hereinafter, the first detector 112 according to the embodiment will be described with reference to FIGS. 3A and 3B.

Figure 3:
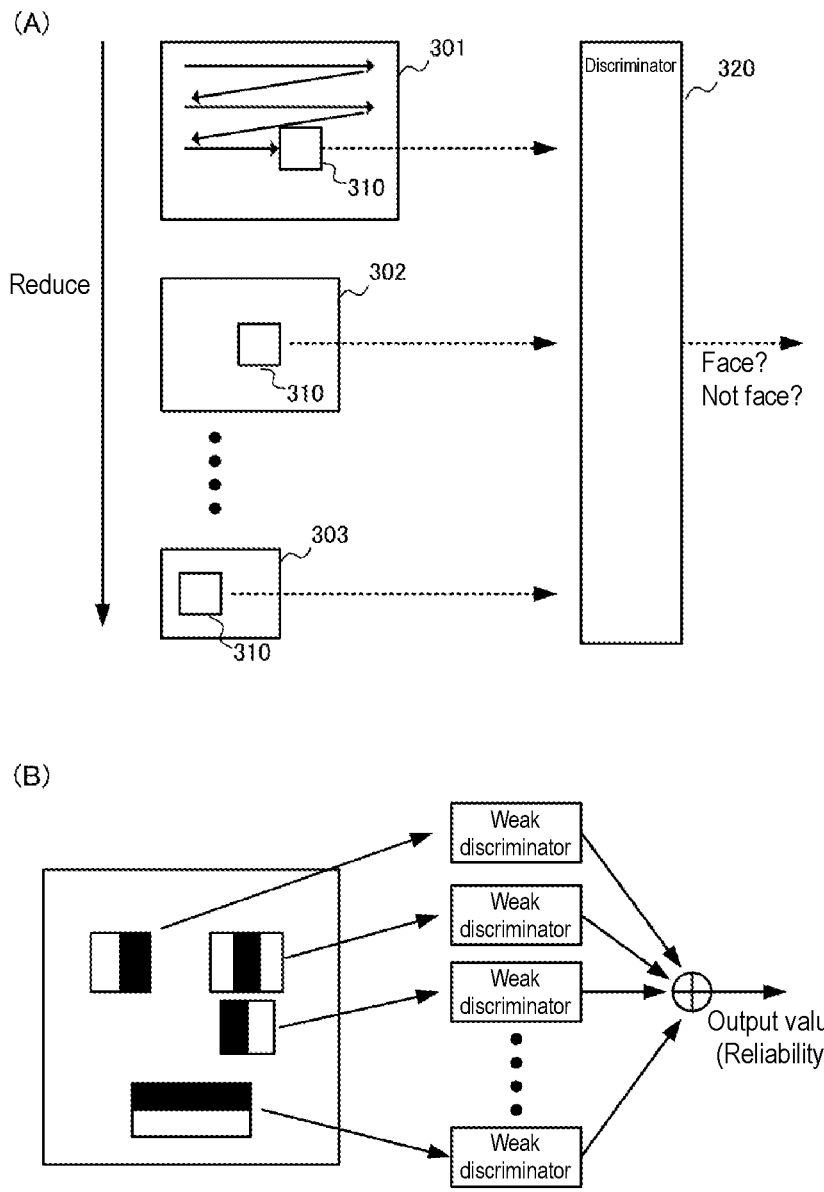
FIGS. 3A and 3B are conceptual diagrams illustrating a first detector.

As illustrated in FIG. 3A, in order to detect faces of various sizes, the first detector 112 cuts out a rectangular region 310 of a predetermined region from each of reduced images 301 to 303 obtained by reducing the input image at a plurality of magnifications, and uses a discriminator 320 to judge whether or not a face is included in the region. By scanning the rectangular regions 310 in the reduced images 301 to 303, faces of various sizes included in the image can be detected. Note that even though the rectangular region is cut out in the embodiment, the region to be cut out may be a region having any shape other than a rectangle.

As illustrated in FIG. 3B, the discriminator 320 judges whether or not the matching pattern cut out by the rectangular region 310 is a face. The discriminator 320 extracts a feature quantity (Haar-like feature quantity) based on a light-dark relationship from a plurality of local regions in the matching pattern. The discriminator 320 has a plurality of weak discriminators, and each weak discriminator judges whether or not the matching pattern is a face according to a small feature quantity. Although the discrimination performance of each weak discriminator is low, it is possible to highly accurately judge whether or not it is a face by combining the plurality of weak discriminators. Note that the discriminator 320 outputs as an output value the probability (reliability) that the matching pattern is a face pattern. Therefore, a region with reliability higher than or equal to a predetermined threshold is treated as a face candidate region.

Figure 4:
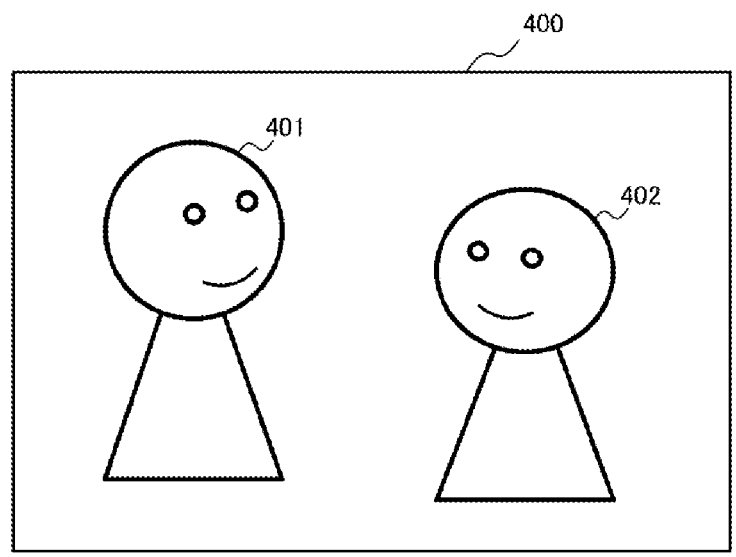
FIG. 4A is a view illustrating an example of an input image.
FIG. 4B is a view illustrating an example of the face detection result for the input image, obtained by the first detector.
Figure 4:
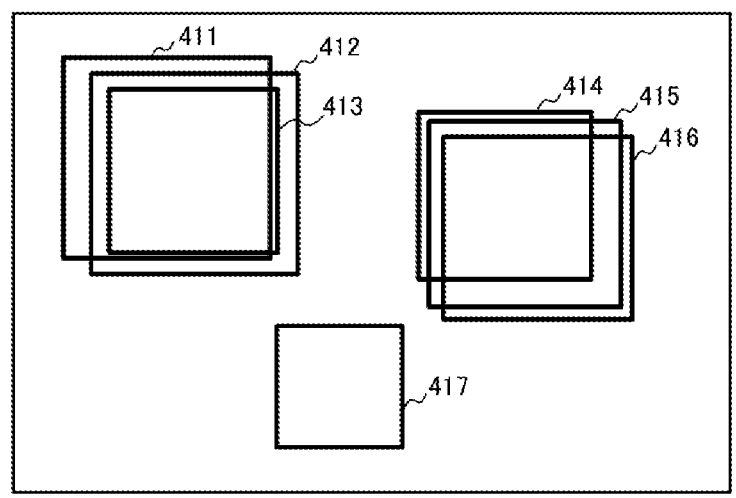

A specific example of a face detection process performed by the first detector 112 in step S2 will be described with reference to FIGS. 4A and 4B. FIG. 4A illustrates an input image 400. Persons 401 and 402 are in the input image 400. If the first detector 112 performs a face detection process on such an input image 400, the first detector 112 detects a plurality of face candidate regions around the faces of the persons 401 and 402. This is because even if the position and size of the matching pattern slightly change around the face, the matching pattern is judged to be a face.

FIG. 4B illustrates an exemplary detection result for the input image 400. Three face candidate regions 411, 412, 413 are detected around the face of the person 401, and three face candidate regions 414, 415, 416 are detected around the face of the person 402. In addition, a face candidate region 417 is detected also in a region where no face actually exists. This occurs in a case where the background pattern happens to be similar to a face.

[S3: Integrated Region Determination Process]

Figure 5:
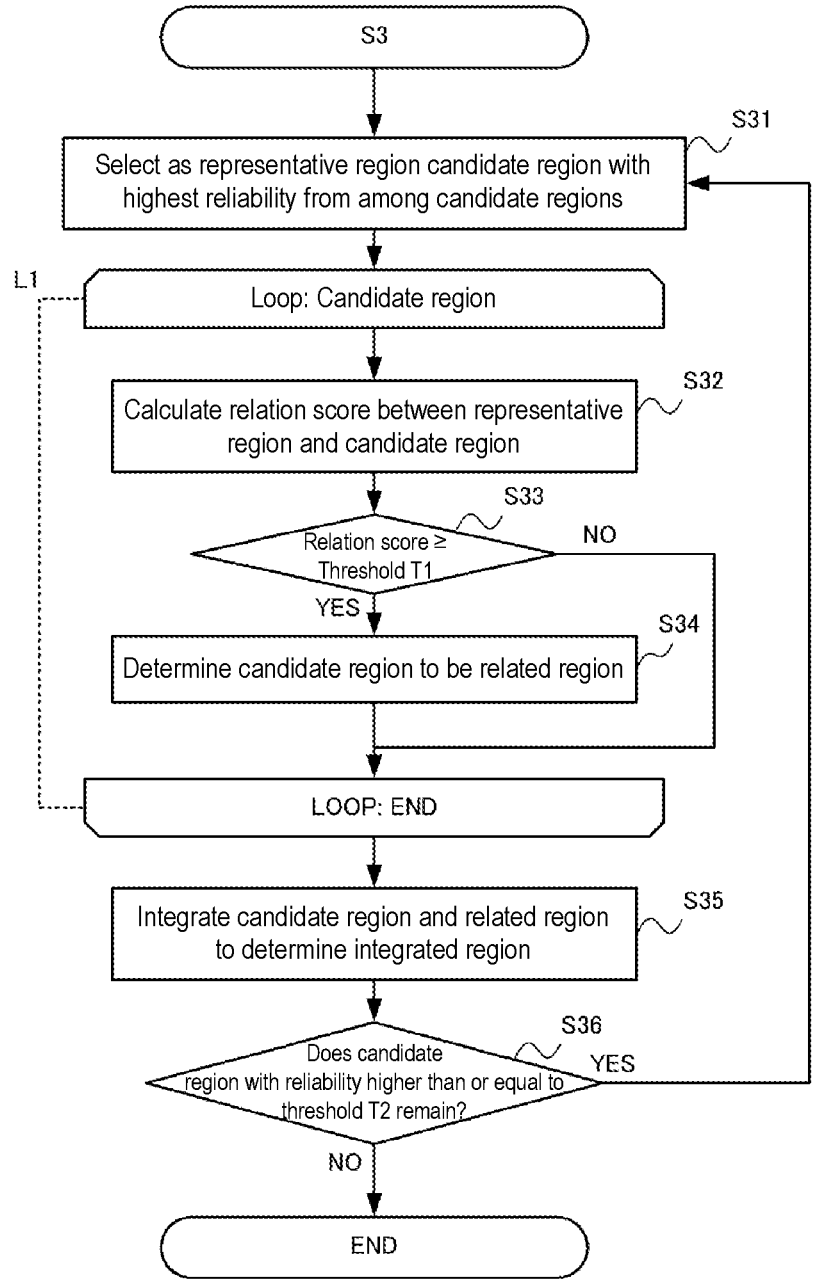
FIG. 5 is a flowchart illustrating a flow of a region integrating process.

In step S3, the integrating unit 113 integrates the plurality of candidate regions detected in step S2, and determines an integrated region where the second detector 114 performs detection. The integrating unit 113 divides a plurality of candidate regions into groups, and determines one integrated region from among the candidate regions of each group. FIG. 5 is a flowchart illustrating details of an integrated region determination process performed by the integrating unit 113. Hereinafter, a description will be given according to the flowchart in FIG. 5.

In step S31, the integrating unit 113 selects, from the plurality of candidate regions detected in step S2, the candidate region with the highest reliability as the representative region. Note that the representative region is not necessarily determined only according to reliability, and may be determined in consideration of other information such as the region size or face orientation. When considering the region size, a region having a larger size may be given priority, or a region close to a predetermined size may be given priority. In addition, the representative region may be determined according to the region size or other information without using reliability.

A process loop L1 of steps S32 to S34 is executed for the plurality of detected candidate regions other than the representative region. A candidate region to be processed in the loop L1 is herein referred to as a focused-on candidate region.

In step S32, the integrating unit 113 calculates a relation score between the representative region and the focused-on candidate region. The relation score is a score representing the probability that the representative region and the focused-on candidate region are the regions of the same face. The relation score can be calculated according to the distance between the regions (for example, the distance between the region centers) and the size of the candidate region. For example, the shorter the distance between the regions is, the greater the calculated relation score is. In addition, the smaller the difference in region size is, the greater the calculated relation score is.

The distance between the regions and the similarity of the region sizes can be regarded as examples of the similarity of the detection result obtained by the first detector 112. The relation score may be determined according to similarity of another item of the detection result obtained by the first detector 112. For example, the relation score may be calculated according to similarity of the detected face orientations and similarity of the detected face attribute (for example, age, sex, race, facial expression, or the like). In the case of determining a relation score in consideration of a plurality of elements, a function including these plurality of elements as variable may be used. Simply, a relation score may be determined by the average or the weighted average of similarities of respective element. The weight in the case of the weighted average may be appropriately determined.

In step S33, the integrating unit 113 judges whether or not the relation score of the focused-on candidate region is greater than or equal to a threshold T1. In a case where the relation score is greater than or equal to the threshold T1 (step S33—YES), the integrating unit 113 determines that the focused-on candidate region is a related region of the representative region in step S34. That is, the focused-on candidate region is grouped into the same group as that of the representative region.

By performing the above steps S32 to S34 for all the candidate regions, candidate regions related to the representative region can be determined.

Note that, here, candidate regions having a relation score greater than or equal to a threshold T1 are determined to be related regions. However, candidate regions having top predetermined number of greatest relation scores may be determined to be related regions. Alternatively, candidate regions having relation scores greater than or equal to the threshold T1 and having top predetermined number of greatest relation scores may be determined to be related regions.

In step S35, the integrating unit 113 integrates the representative region and the related regions thereof to determine the integrated region. The method of determining the integrated region is not particularly limited. Here, two methods of determining the integrated region will be described with reference to FIGS. 6A and 6B.

Figure 6:
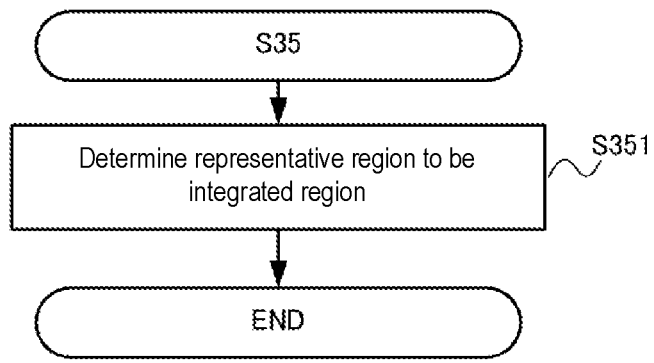
FIGS. 6A and 6B are flowcharts illustrating examples of the process for determining an integrated region from a representative region and a related region.
Figure 6:
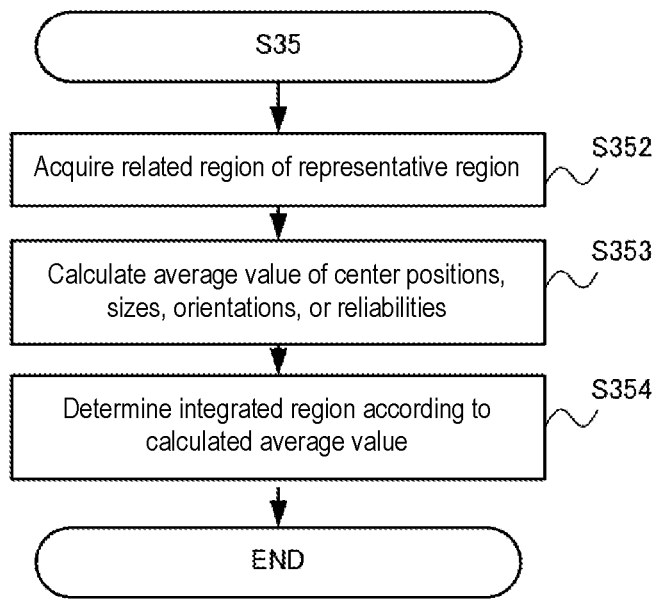

For example, as illustrated in FIG. 6A, in the integrated region determination process S35, the representative region itself may be determined to be the integrated region (step S351). Alternatively, as illustrated in FIG. 6B, the integrated region determination process S35 may be configured of the following steps. First, a related region belonging to the same group as that of the representative region is acquired (step S352). Next, an average value of parameters for determining the regions is calculated for the representative region and the related region (Step S353). Finally, a region having the calculated average value as a parameter is determined to be an integrated region (step S354). Examples of the parameter include an average value of the region centers and an average value of the region sizes. Examples of other parameters include reliability, face orientation, age, sex, race, facial expression, and the like.

In step S36, it is judged whether or not there remains a candidate region with reliability higher than or equal to a threshold T2. Specifically, it is judged whether or not there is a candidate region with reliability higher than or equal to the threshold T2, other than the regions judged to be the representative region or a related region from among the candidate regions detected by the first detector 112. In a case where there is a candidate region with reliability higher than or equal to a threshold T2, the process returns to step S31 and the above process is repeated. At this time, the regions determined to be the representative region or the related region is excluded from the processing target, and the processes in steps S31 to S35 are performed.

Here, grouping of candidate regions will be described according to specific examples with reference to FIGS. 7A to 7D, 8A, and 8B.

Figure 7A:
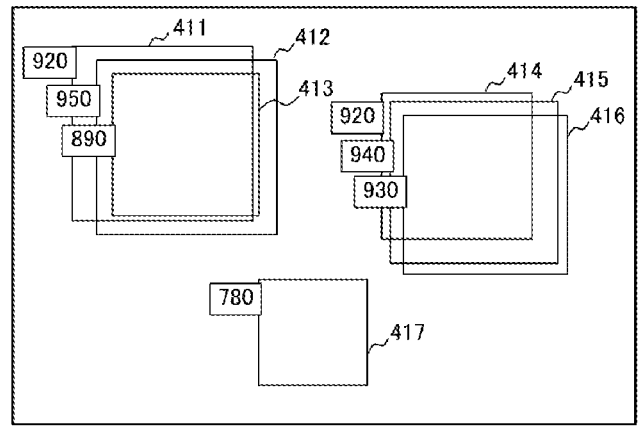
FIG. 7A is a view for explaining an example of the region integrating process and illustrates an example of the candidate region.

FIG. 7A is similar to the detection result of the first detector 112 illustrated in FIG. 4B, and seven candidate regions 411 to 417 are illustrated as candidate regions. Here, the number enclosed in a square represents reliability of each region (with the maximum of 1000 points). That is, the reliability of the candidate region 411 is 920, and the reliability of the candidate region 412 is 950.

Figure 7B:
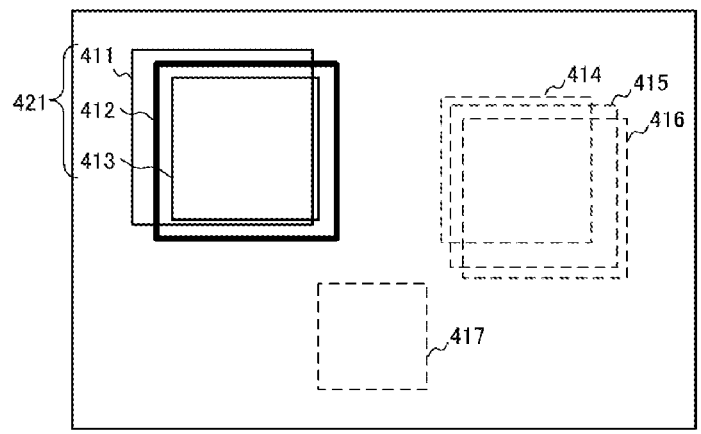
FIG. 7B is a view for explaining an example of the region integrating process, and illustrates examples of the determination results of the representative region and the related regions.

In step S31, the candidate region with the highest reliability is selected. In this example, the candidate region 412 is selected as the representative region. Here, it is assumed that the relation score is calculated only according to the distance between the regions. Then, the candidate regions 411 and 413 close to the representative region 412 have a relation score greater than or equal to a threshold. However the relation scores of the other regions are lower than the threshold. Therefore, it is judged that the candidate regions 411 and 413 are related regions of the representative region 412, and the candidate regions 411 to 413 form one group 421 as illustrated in FIG. 7B. Then, according to the candidate regions 411 to 413, one integrated region is determined.

Next, processes similar to the above are repeated for the candidate regions 414 to 417. At this time, the candidate region 415 is determined to be the representative region and the candidate regions 414, 416 are determined to be related regions of the representative region 415, and the candidate regions 414 to 416 form one group 422. Then, one integrated region is determined from these candidate regions.

Similar processes are repeated again, and the candidate region 417 is determined to be the representative region. Since there is no candidate region having the relation score with the candidate region 417 greater than or equal to the threshold, only the candidate region 417 forms one group 423. Then, one integrated region is determined according to the candidate region 417.

Figure 7C:
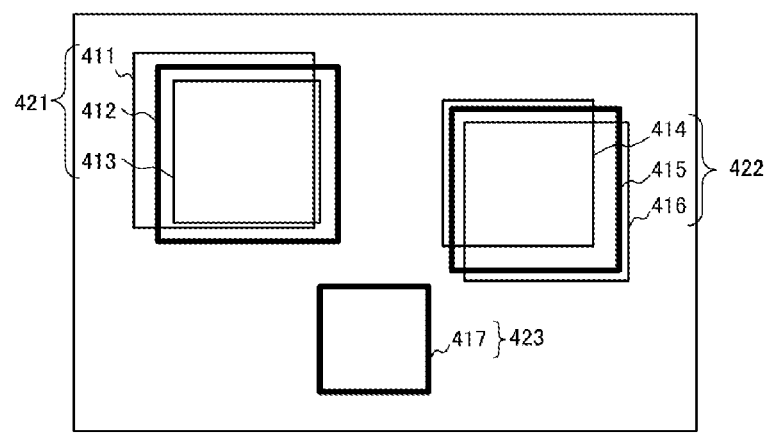
FIG. 7C is a view for explaining an example of the region integrating process, and illustrates examples of the determination results of the representative region and the related regions.
Figure 7D:
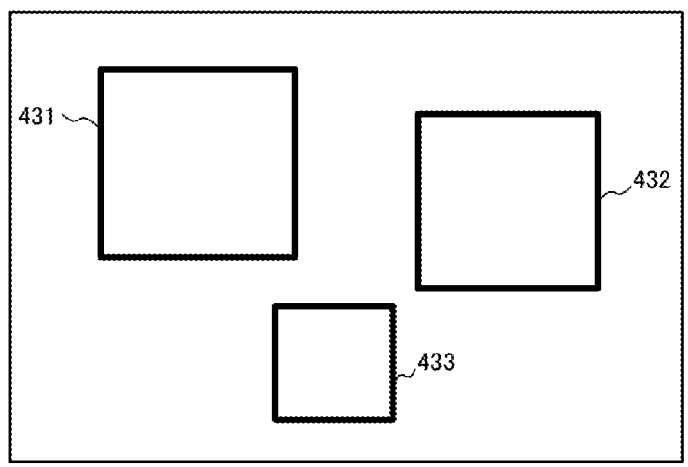
FIG. 7D is a view for explaining an example of the region integrating process and illustrates examples of the integrated regions finally determined.

FIG. 7C illustrates the representative regions (thick lines) and the related regions (thin lines) of the respective groups 421 to 423 determined as described above. FIG. 7D is a view illustrating integrated regions 431 to 433 determined for the respective groups 421 to 423.

Figure 8:
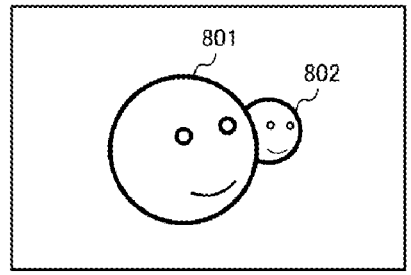
FIGS. 8A, 8B, and 8C are views for explaining another example of the region integrating process.
Figure 8:
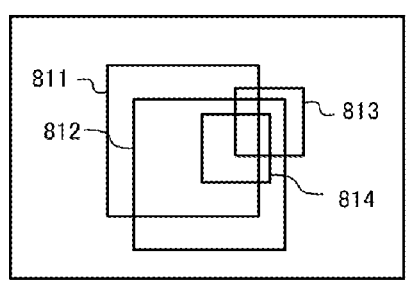
Figure 8:
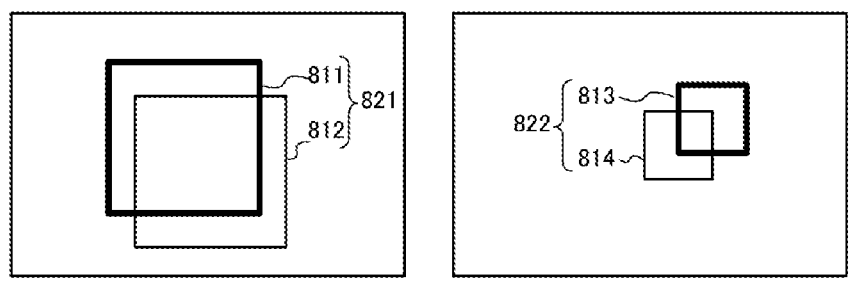

FIGS. 8A and 8B are views for explaining an example in which grouping is performed in consideration of the similarity of detection results obtained by the first detector 112 in addition to the distance between regions. Here, an example in which the size of a region among detection results is focused on will be described.

FIG. 8A illustrates an example of the input image. Here, the faces of two persons 801 and 802 are close to each other in the image. FIG. 8B is a view illustrating a detection result obtained by the first detector 112, for the input image of FIG. 8A. Here, candidate regions 811 and 812 are detected in association with the face of the person 801, and candidate regions 813 and 814 are detected in association with the face of the person 802.

Here, if the related region is determined simply by focusing on the distance between the regions, there is a possibility that all the candidate regions 811 to 814 will be classified into one group. However, by considering the similarity of the region size in addition to the distance between the regions upon calculation of the relation score, the candidate regions 811 and 812 and the candidate regions 813 and 814 can be grouped into different groups 821 and 822 as illustrated in FIG. 8C. That is, even if the positions of the persons 801 and 802 are close to each other in the image, it is possible to appropriately generate an integrated region corresponding to each person.

Here, an example of focusing on the region size as the similarity of detection results has been explained. However, it is apparent that the relation score may be calculated by focusing on one or a plurality of the region size, and attributes such as age, sex, race, facial expression, face orientation, and the like.

[S4: Second Face Detection Process]

In step S4, the second detector 114 judges whether or not a face is included in each of the integrated regions determined in step S3. The second detector 114 is a discriminator which has learned using a multilayer neural network called a convolutional neural network (CNN). Heterogeneous learning allows not only face/non-face discrimination, but also multi-task discrimination such as face orientation, age, sex, race, and facial expression. The second detector 114 of the embodiment also implements these discrimination tasks.

Figure 9:
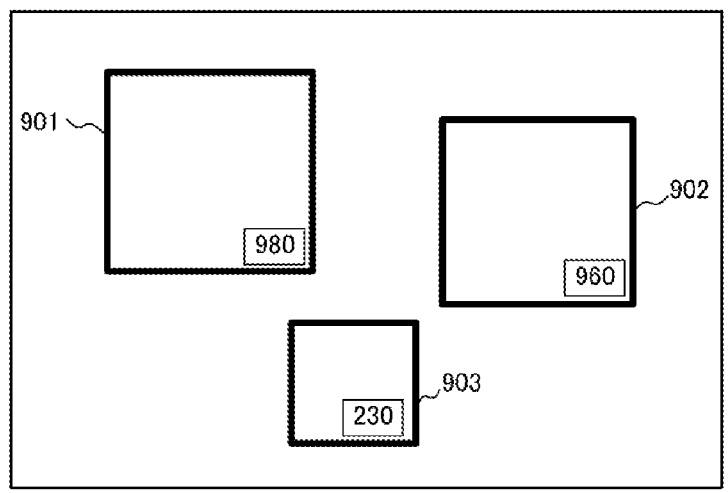
FIG. 9A illustrates an example of the face detection result for the integrated region, obtained by a second detector.
FIG. 9B illustrates an example of detection result information output by a result output unit.
Figure 9:
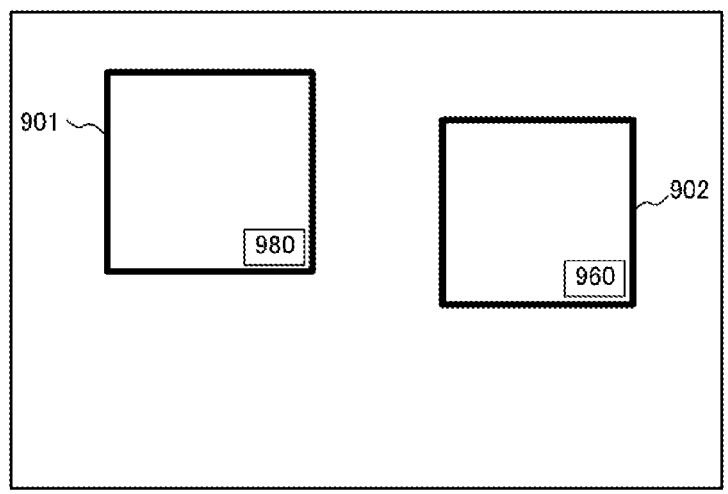

FIG. 9A illustrates the result of detection that the second detector 114 performed for three integrated regions 901 to 903. In FIG. 9A, reliability obtained by the second detector 114 is indicated. Here, the reliabilities of the integrated regions 901 and 902 are as high as 980 and 960, respectively, while the reliability of the integrated region 903 is as low as 230. Therefore, the face detection device 100 can judge that the integrated regions 901 and 902 are face regions, while the integrated region 903 is not a face region.

[S5: Detection result output process]

In step S5, the result output unit 115 outputs the detection result for the region where the face is detected in the second face detection process. The result output unit 115 outputs result information indicating that a face is detected in the integrated region with reliability of the detection result in the second face detection process higher than or equal to a threshold. The result information does not need to include the integrated region with reliability lower than the threshold. The detection result information includes at least a face region, and in addition to this, preferably includes one or more of reliability, face orientation, age, sex, race, facial expression, and the like.

The detection result information to be output may be a detection result obtained by the second detector 114. That is, the detection result information may be reliability, face orientation, age, sex, race, facial expression, or the like obtained as a result of detection performed by the second detector 114 for the integrated region.

The detection result information to be output may be a detection result obtained by the first detector 112. The detection result obtained by the first detector 112 may be a result of detection performed by the first detector 112 for the representative region from which the integrated region is generated, or may be the average or the weighted average of the results of detection performed by the first detector 112 for the representative region and the related region.

The detection result information to be output may be the average or the weighted average of the detection result obtained by the second detector 114 and the detection result obtained by the first detector 112. A predetermined value may be used as the weight in the weighted average.

The result output unit 115 may output the detection result information in any manner. For example, the result output unit 115 may display the detection result information on a screen, may store the detection result information in the storage device, may notify the detection result information of another module or another device, or may perform a plurality of the above.

Effect of Embodiment

If the face detection process of a Haar-like feature quantity+adaboost learning and the face detection process of deep learning (CNN) are compared with each other, the latter is more accurate but requires more computation amount. Therefore, in a computer such as a portable information terminal that has relatively few computing resources, if deep learning-type face detection is performed on the entire input image, the processing time becomes long. In contrast, in the embodiment, first, a region where a face is likely to exist is narrowed down by using a simple face detection process, and deep learning-type face detection is performed only on this region. Therefore, both detection accuracy and detection speed can be secured. In addition, in the embodiment, deep learning-type face detection is performed not on all the candidate regions obtained in the simple face detection process, but on the region obtained by grouping and integrating the candidate regions. Therefore, the detection speed is further improved.

Second Embodiment

In the first embodiment, a description has been given assuming that face detection is performed on one image. In the embodiment, face detection is continuously performed on a plurality of frame images constituting a moving image. A face detection process for each frame image is basically similar to that in the first embodiment; however, is different in an integrated region generation process (step S3 in FIG. 2). The same object exists in similar locations in successive frame images. Therefore, in the embodiment, information on the current frame and information on the past frame are considered upon determination of an integrated region.

As a specific method of determining an integrated region, several techniques are assumed. For example, a technique is assumed in which regarding the current frame and the past frame (frame immediately before), an integrated region (hereinafter referred to as a provisional integrated region) is determined by a method similar to that in the first embodiment, and weighted average or averaging is performed on the provisional integrated regions to determine the integrated region for the current frame. The weight of the weighted average may be appropriately determined.

In addition, by performing averaging or weighted averaging on the provisional integrated region of the current frame and the integrated region of the past frame, the integrated region of the current frame may be determined. Since information of the further past frame is used for the integrated region of the past frame, the integrated region of the current frame can be determined in consideration of the further past information.

In addition, by performing averaging or weighted averaging on the representative region and the related region of the current frame and the representative region and the related region of the past frame, the integrated region of the current frame may be determined.

In addition, a threshold T2 (step S36) used when the representative region is determined from the current frame may be set to a lower value to temporarily determine the integrated region, and may adopt the integrated region in a case where reliability for the integrated region is a threshold T3 (>T2). In this way, even if part of the face is hidden or the lighting condition is bad and the face cannot be detected with high reliability in the current frame, the integrated region can be determined if the face can be detected with high reliability in the past frame. That is, by considering the information of the past frame, it is possible to prevent detection omission even in a situation where the face detection accuracy temporarily lowers.

Third Embodiment

In the first embodiment, the second detector 114 performs face detection considering only the image information (pixel value) of the integrated region. A second detector 114 of the embodiment performs a face detection process by also using the detection result of a first detector 112 regarding an integrated region as an input. The "detection result of the first detector 112 regarding the integrated region" includes face orientation, age, sex, race, facial expression, or the like.

In order to enable the second detector 114 to perform such discrimination, in a learning process (generation process) of the second detector 114, learning data including image data and the detection result obtained by the first detector 112 for the image data (face orientation, age, sex, race, facial expression, or the like) may be used.

As described above, by performing the detection process using the detection result obtained by the first detector 112, detection accuracy of the second detector 114 can be improved.

OTHER EMBODIMENTS

In the above description, the first detector 112 is a detecting device using a Haar-like feature quantity and adaboost learning; however, the first detector 112 is not limited to this. For example, any feature quantity such as a Histogram of Gradient (HoG) feature quantity, a SIFT feature quantity, a SURF feature quantity, or a Sparse feature quantity can be used as the feature quantity. In addition, as a learning means, any learning technique such as a boosting technique other than adaboost, a Support Vector Machine (SVM), a neural network, or decision tree learning can be used.

In addition, the second detector 114 is not limited to the CNN, and may be a detecting device based on any technique such as a Recurrent Neural Network (RNN), a Stacked Auto Encoder (SAE), or a Deep Belief Network (DBN). In addition, the second detector 114 may not be a detecting device using deep learning. However, it is desirable that the detection algorithm of the second detector 114 enables detection which is more accurate and has a greater calculation amount than the detection algorithm of the first detector 112.

In addition, in the above description, an object to be detected is a face; however, an object to be detected may be any object. That is, the present invention is applicable to an object detection device that detects any predetermined object. A very small number of examples of the object to be detected include a human body, a specific animal, an automobile, a specific product, and the like.

In addition, in the above description, the object detection device is mounted on a portable information terminal such as a smartphone; however, may be mounted on any device. The object detection device according to the present invention can be mounted on any information processing device (computer) such as a desktop computer, a notebook computer, a slate computer, a smartphone, a mobile phone, a digital camera, or a digital video camera. However, the effect of the present invention becomes more conspicuous by being mounted on a device having relatively few computing resources.

DESCRIPTION OF SYMBOLS 100 face detection device
111 image input unit
112 first detector
113 integrating unit
114 second detector
115 result output unit 400 input image
411 to 417 candidate region
421 to 423 group
431 to 433 integrated region
711 to 714 candidate region
721 to 722 group
901 to 902 integrated region

The invention claimed is:

1. An object detection device detecting a predetermined object from an image, the object detection device comprising at least one processor that operates as:
 a first detection unit configured to detect a plurality of candidate regions where the predetermined object exists from the image;
 a region integrating unit configured to determine a representative region according to reliability of the plurality of candidate regions detected by the first detection unit, and to determine one or a plurality of integrated regions by using the representative region; and
 a second detection unit configured to detect, in the one or the plurality of integrated regions, the predetermined object by using a detection algorithm different from an algorithm of the first detection unit,
 wherein the detection algorithm of the second detection unit has a greater calculation amount than a calculation amount of the detection algorithm of the first detection unit.

2. The object detection device according to claim 1, wherein the region integrating unit is configured:
 to determine a region related to the representative region according to a predetermined criterion from the plurality of candidate regions other than the representative region, and
 to determine the integrated region by integrating the representative region and the region related to the representative region.

3. The object detection device according to claim 2, wherein the region integrating unit is configured to determine one of the one or the plurality of integrated regions and to determine another of the one or the plurality of integrated regions for a candidate region obtained by excluding the representative region and the region related to the representative region from the plurality of candidate regions detected by the first detection unit.

4. The object detection device according to claim 2, wherein the region integrating unit determines whether or not each candidate region of the plurality of candidate regions is a region related to the representative region, according to a distance between the representative region and each candidate region of the plurality of candidate regions.

5. The object detection device according to claim 4, wherein the region integrating unit determines whether or not each candidate region of the plurality of candidate regions is a region related to the representative region, according to similarity between a detection result for the representative region, obtained by the first detection unit and a detection result for each candidate region of the plurality of candidate regions, obtained by the first detection unit.

6. The object detection device according to claim 2, wherein the region integrating unit determines the representative region to be the integrated region.

7. The object detection device according to claim 2, wherein the region integrating unit determines the integrated region to be a region obtained by averaging or performing a weighted average on the representative region and the candidate region related to the representative region.

8. The object detection device according to claim 2, wherein:
 the image is a moving image,
 the object detection device detects the object from a plurality of frames of the moving image, and
 the region integrating unit is configured to determine, to be the integrated region, a region obtained by averaging or performing a weighted average on the representative region of a current frame, a region related to the representative region of the current frame, the representative region of a past frame, and a region related to the representative region of the past frame.

9. The object detection device according to claim 1, wherein the at least one processor further operates as an output unit configured to output detection result information indicating that the predetermined object is detected in the one or the plurality of integrated regions in which reliability of a detection result obtained by the second detection unit is higher than or equal to a threshold.

10. The object detection device according to claim 9, wherein the detection result information includes at least one of a detection result obtained by the first detection unit, a detection result obtained by the second detection unit, and a result of integrating the detection result obtained by the first detection unit and the detection result obtained by the second detection unit.

11. The object detection device according to claim 1, wherein the predetermined object is one of a human face and a human body.

12. An object detection method of detecting a predetermined object from an image, the object detection method comprising:
 a first detection step of causing a computer to detect a plurality of candidate regions where the predetermined object exists from the image;
 an integrated region determination step of causing the computer to determine a representative region according to reliability of the plurality of candidate regions detected in the first detection step and determine one or a plurality of integrated regions by using the representative region; and
 a second detection step of causing the computer to detect, in the one or the plurality of integrated regions, the predetermined object by using a detection algorithm different from an algorithm of the first detection step,
 wherein the detection algorithm of the second detection step has a greater calculation amount than a calculation amount of the detection algorithm of the first detection step.

13. A non-transitory computer-readable medium storing a program causing a computer to execute each of the steps of the object detection method according to claim 12.

* * * * *